United States Patent
Tanaka et al.

(10) Patent No.: US 7,500,640 B2
(45) Date of Patent: Mar. 10, 2009

(54) HOLLOW ASSEMBLY STRUCTURE AND FABRICATION METHOD THEREFOR

(75) Inventors: Yutaka Tanaka, Hyogo (JP); Haruhiko Kakimoto, Hyogo (JP)

(73) Assignee: ShinMaywa Industries, Ltd., Hyogo (JP)

( * ) Notice: Subject to any disclaimer, the term of this patent is extended or adjusted under 35 U.S.C. 154(b) by 0 days.

(21) Appl. No.: 11/026,086

(22) Filed: Jan. 3, 2005

(65) Prior Publication Data

US 2006/0108474 A1    May 25, 2006

(51) Int. Cl.
   *B64C 3/26* (2006.01)
(52) U.S. Cl. .................. 244/123.7; 244/131; 244/132
(58) Field of Classification Search ............... 244/132, 244/123.7, 131; 228/2.1, 112.1
   See application file for complete search history.

(56) References Cited

U.S. PATENT DOCUMENTS

| | | | |
|---|---|---|---|
| 2,019,272 A * | 10/1935 | Ragsdale | 244/123.2 |
| 4,063,676 A * | 12/1977 | Lilly | 228/114 |
| 4,811,887 A * | 3/1989 | King et al. | 228/2.3 |
| 5,697,511 A * | 12/1997 | Bampton | 220/4.12 |
| 5,794,835 A * | 8/1998 | Colligan et al. | 228/2.1 |
| 5,813,592 A * | 9/1998 | Midling et al. | 228/112.1 |
| 6,190,484 B1 * | 2/2001 | Appa | 156/189 |
| 6,237,835 B1 * | 5/2001 | Litwinski et al. | 228/112.1 |
| 6,328,261 B1 * | 12/2001 | Wollaston et al. | 244/132 |
| 6,779,707 B2 * | 8/2004 | Dracup et al. | 228/112.1 |
| 6,933,057 B2 * | 8/2005 | Young et al. | 428/593 |
| 7,234,668 B2 * | 6/2007 | Wollaston et al. | 244/132 |
| 2001/0052561 A1 * | 12/2001 | Wollaston et al. | 244/132 |

FOREIGN PATENT DOCUMENTS

| | | |
|---|---|---|
| JP | 10-249554 | 9/1998 |
| JP | 11-070942 | 3/1999 |
| JP | 2000-061664 | 2/2000 |
| JP | 2002-126881 | 5/2002 |
| JP | 2003-266184 | 9/2003 |
| JP | 2004-017097 | 1/2004 |
| WO | WO 93/10935 | 6/1993 |

OTHER PUBLICATIONS www.nsf.gov/eng/iucrc/directory/csfp.jsp (date unavailable).*
www.twi.co.uk/j32k/unprotected/band_1/fswapp.html (first available Jul. 12, 2001).*

(Continued)

*Primary Examiner*—Rob Swiatek
(74) *Attorney, Agent, or Firm*—Studebaker & Brackett PC; Donald R. Studebaker (57) ABSTRACT

A movable trailing edge is composed of a main body including a structural frame member in which a spar and a rib intersect with each other, and a first outer plate that covers the main body. The first outer plate is placed on and cover the structural frame member, a rotating probe is pressed against the first outer plate from the obverse side thereof to friction stir weld the first outer plate and the side end face of the structural frame member. Joint parts are arranged in a dotted pattern.

9 Claims, 5 Drawing Sheets

OTHER PUBLICATIONS

"Welding." Wikipedia, The Free Encyclopedia. May 28, 2007, 01:32 UTC. Wikimedia Foundation, Inc. May 29, 2007 <http://en.wikipedia.org/w/index.php?title=Welding&oldid=133979031>.*

"Friction stir welding." Welding, The Free Encyclopedia. May 15, 2007, 20:23 UTC. Wikimedia Foundation, Inc. May 29, 2007 <http://en.wikipedia.org/w/index.php?title=Friction_stir_welding&oldid=131122475>.*

"Spot welding." Wikipedia, The Free Encyclopedia. May 21, 2007, 07:59 UTC. Wikimedia Foundation, Inc. May 29, 2007 <http://en.wikipedia.org/w/index.php?title=Spot_welding&oldid=132394436>.*

* cited by examiner

HOLLOW ASSEMBLY STRUCTURE AND FABRICATION METHOD THEREFOR

FIELD OF THE INVENTION

The present invention relates to a hollow assembly structure and a method for fabricating it, and particularly relates to a hollow assembly structure applicable to a movable trailing edge of an aircraft and the like.

DESCRIPTION OF THE PRIOR ART

In hollow assembly structures formed by assembling a plurality of members, joining means for joining the members are necessary. As the joining means, adhesives, screws and the like are listed for example.

However, it is difficult in fabrication of hollow structures with the use of adhesives or screws to ensure sufficient joint strength. For this reason, when hollow assembly structures are applied to the cases where sufficient joint strength is required, rivet joining or welding by melting the joint parts are employed.

The rivet joining, however, invites increase in weight of an assembly structure. Also, the welding by melting the joint parts is difficult to be employed in joining of different materials. In this connection, friction welding methods by joining joint parts in the state of solid phase, not by melting, have been proposed as a technique for overcoming the aforementioned problems.

International Application Publication No. 93/10935 disclosed a friction stir welding in which the side faces of two members are put in contact with each other and a rotating probe is moved along the contact portion between the side faces of the members to cause plastic flow, thereby joining the members.

Japanese Patent Application Laid Open Publication No. 10-249554A discloses a technique in which the side face of a rib and an aluminum plate are abutted to each other and joined by friction stir welding.

Japanese Patent Application Laid Open Publication No. 2000-61664A discloses a technique of joining two plates overlaid with each other by friction stir welding.

For friction stir welding, a probe for causing friction in objects to be joined is used. If the objects to be joined is displaced or unsteady at press of the probe against the objects to be joined, insufficient friction force is generated. In this connection, in conventional friction stir welding, the objects to be joined are fixed by an exclusive jig, and then, the probe is pressed.

However, various exclusive jigs are necessary for various objects to be joined, and therefore, workability is not necessarily excellent. Also, the fabrication cost is increased as various jigs are required.

SUMMARY OF THE INVENTION

The present invention has been made in view of the above problems and has its object of providing a technique for realizing low-cost friction welding with excellent workability.

In the present invention, a hollow assembly structure is composed of a structural frame member and an outer plate and the structural frame is formed in a shape suitable for friction stir welding or friction pressure welding beforehand, thereby necessitating no jigs.

Specifically, a hollow assembly structure according to the present invention includes:

a structural frame member including at least one first plate and at least one second plate, the first plate and the second plate being arranged so that plate faces thereof intersect each other for keeping postures of the first plate and the second plate by each other; and an outer plate that covers the structural frame member, wherein the outer plate is overlaid with a side end face of the first plate or the second plate of the structural frame member, and the outer plate is friction stir welded or friction pressure welded to the side end face of the first plate or the second plate by applying a tool from an obverse side of the outer plate.

Thus, the structural frame is composed of the first plate and the second plate which intersect with each other. Therefore, even when comparatively large force is applied to the first or second plate from the side end face for friction stir welding or friction pressure welding, the first plate or the second plate is neither moved, displaced nor buckled. For example, when the outer plate is friction stir welded or friction pressure welded to the first plate, the second plate serves as a jig for keeping the posture of the first plate. Further, when force is applied to the structural frame member from the side end face side, large reaction force is caused by rigidity of the structural frame member itself. Thus, the outer plate and the structural frame member are friction stir welded or friction pressure welded by pressing the probe from the obverse side of the outer plate even with no exclusive jig used.

In a preferred embodiment according to the present invention, the structural frame member is formed by shaving out a block member, and the first plate and the second plate are formed integrally.

Hence, the strength of the structural frame member is increased and the reliability of the friction stir welding or the friction pressure welding is enhanced.

In a preferred embodiment according to the present invention, the outer plate is friction stir welded or friction pressure welded to the side end face of the first plate or the second plate so as to cover one side of the structural frame member, an additional outer plate is provided which covers another side of the structural frame member, and the structural frame member and the additional outer plate are formed by shaving out the block member so as to be integral.

Whereby, a sealed hollow assembly structure is obtained. Integral formation of the additional outer frame with the integrally formed structural frame member increases the strength of the structural frame member and enhances the reliability of the friction stir welding or the friction pressure welding.

In a preferred embodiment according to the present invention, joint parts of the structural frame member and the outer plate are arranged in the outer plate in a dotted pattern. In this structure, the friction stir welding or the friction pressure welding can be conducted speedily at low cast.

In a preferred embodiment according to the present invention, joint parts of the structural frame member and the outer plate are arranged in the outer plate linearly. For example, the joint parts of the outer plate may be arranged in the form of straight lines or curved lines. In so dong, the joining strength by the friction stir welding or the friction pressure welding is increased.

In a preferred embodiment according to the present invention, the first plate serves as a spar, the second plate serves as a rib, and the outer plate serves as a blade face.

With this constitution, the wing assembled by the friction stir welding or the friction pressure welding can be obtained efficiently at low cost.

A movable trailing edge for an aircraft according to the present invention includes:

a main body which is formed in a box shape having an opening by shaving and of which outer face serves as one of blade faces, a spar or a rib being formed inside of the main body integrally; and an outer plate which covers the opening of the main body and of which obverse face serves as another blade face, wherein the outer plate is overlaid with a side end face of the spar or the rib of the main body, and the outer plate is friction stir welded or friction pressure welded by applying a tool from an obverse side thereof to the side end face of the spar or the rib.

With this construction, the wing assembled by the friction stir welding or the friction pressure welding can be obtained efficiently at low cost.

According to the present invention, a fabrication method for a hollow assembly structure composed of an assembly of an outer plate and a structural frame member which includes at least one first plate and at least one second plate, includes the steps of:

setting the first plate and the second plate by intersecting plate faces thereof with each other for keeping postures of the first plate and the second plate by each other;

covering the outer plate over the structural frame member so that a reverse face of the outer member is in contact with at least one of side end faces of the first plate and the second plate of the structural frame member; and joining the outer plate to the side end face by friction stir welding or friction pressure welding face in a manner that a probe of a tool is rotated and pressed against the outer plate from an obverse side thereof with no exclusive jig used for keeping the posture of the first plate or the second plate, utilizing a state where the postures of the first plate and the second plate are kept.

Hence, the workability in the friction stir welding or the friction pressure welding is enhanced, the fabrication cost is lowered and a hollow assembly structure having high strength can be obtained.

In a preferred embodiment according to the present invention, the structural frame member is formed by shaving out a block member.

Hence, the strength of the structural frame member is increased and the reliability of the friction stir welding or the friction pressure welding is enhanced.

In a preferred embodiment according to the present invention, the outer plate is joined to the side end face so that joint parts are arranged in a dotted pattern.

As a result, the friction stir welding or the friction pressure welding is conducted speedily at low cost.

In a preferred embodiment according to the present invention, the outer plate is joined to the side end face by continuous welding.

As a result, the joining strength by the friction stir welding or the friction pressure welding is increased.

In a preferred embodiment according to the present invention, in the step of joining the outer plate to the side end face of the first plate or the second plate, the outer plate is friction stir welded to the side end face in a manner that a probe having a pin of which length protruding from a shoulder is longer than a thickness of the outer plate is rotated at a number of rotation in a range between 750 rpm and 3000 rpm, both inclusive, and the pin is pressed against of the outer plate from an obverse side so as to reach the side end face.

Therefore, the outer plate is friction stir welded to the first plate or the second plate firmly.

In a preferred embodiment according to the present invention, in the step of joining the outer plate to the side end face of the first plate or the second plate, the outer plate is friction stir welded to the side end face continuously in a manner that a probe having a pin of which length protruding from a shoulder is longer than a thickness of the outer plate is rotated at a number of rotation in a range between 750 rpm and 3000 rpm, both inclusive, and the pin is pressed against the outer plate from an obverse side so as to reach the side end face, while setting an angle of the tool to be a lead angle in a range between 0 degree and 5 degrees, both inclusive, and setting a feed speed of the tool to be in a range between 300 mm/minute and 1000 mm/minute, both inclusive.

Therefore, continuous friction stir welding of the outer plate to the first plate or the second plate can be conducted efficiently and securely.

DETAILED DESCRIPTION OF THE INVENTION

The embodiments of the present invention will be described below with reference to the accompanying drawings.

Figure 1:
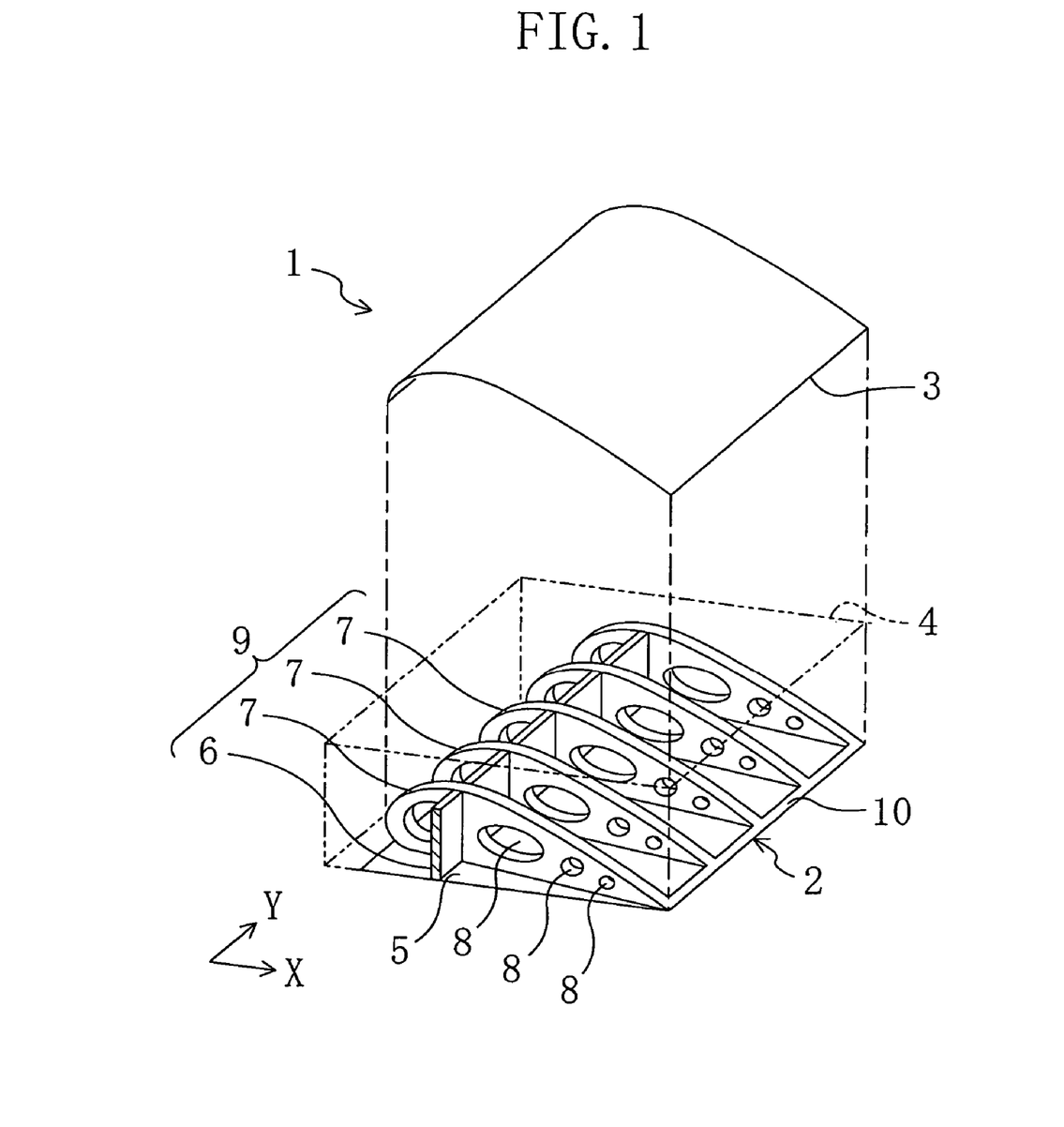
FIG. 1 is an exploded perspective view of a movable trailing edge.

As shown in FIG. 1, a hollow assembly structure according to the present invention is a movable trailing edge 1 of an aircraft. The movable trailing edge 1 is composed of an assembly of a main body 2 and a first outer plate 3. Wherein, the left side, the right side, the upper side and the lower side in FIG. 1 mean the front side, the rear side, the upper side and the lower side of the movable trailing edge 1, respectively, for the convenience sake. These directions do not necessarily limit the movable trailing edge 1 in use.

The main body 2 is a shaved member formed by shaving out a block material 4 made of aluminum. Each portion of the main body 2 is thin, namely, the main body 2 is a thin member.

The main body 2 includes: a second outer plate 5 forming one of blade faces; a spar (first plate) 6 extending along a span direction (Y direction in FIG. 1); and a plurality of ribs 7 (second plates) arranged in the span direction. Each of the spar 6 and the ribs 7 is formed in a plate shape and stands upright so that each principal plane thereof intersects at a right angle with a horizontal direction. Holes 8 are formed in each rib 7.

The spar 6 and the ribs 7 compose in combination a structural frame member 9 to be covered with the first outer plate 3 and the second outer plate 5. The spar 6 extends in the transverse direction (the span direction) and each rib extends in the back-and-forth direction so that each rib 7 intersects with the spar 6. In other words, the structural frame member 9 includes at the side end face thereof straight portions extending in the lengthwise direction (X direction) and a straight portion extending in the transverse direction (Y direction), which intersect with each other.

The second outer plate 5, the spar 6 and the ribs 7 are formed integrally and the main body 2 is formed in a box shape having an opening, as a whole. A joint portion 10 in a thin plate shape extending in the span direction is formed in the rear portion of the main body 2. The joint portion 10 is bent frontward from the rear end of the second outer plate 5 and continues at the upper face thereof smoothly (namely, with no step formed) to the side end face of the rear end portion of each rib 7. A similar joint portion is formed in the front portion of the main body 2.

The first outer plate 3 is a member that forms the other blade face and made of a thin curved aluminum plate. The first outer plate 3 is formed in a shape that follows along the contour of the main body 2 to cover the opening of the main body 2.

Figure 2:
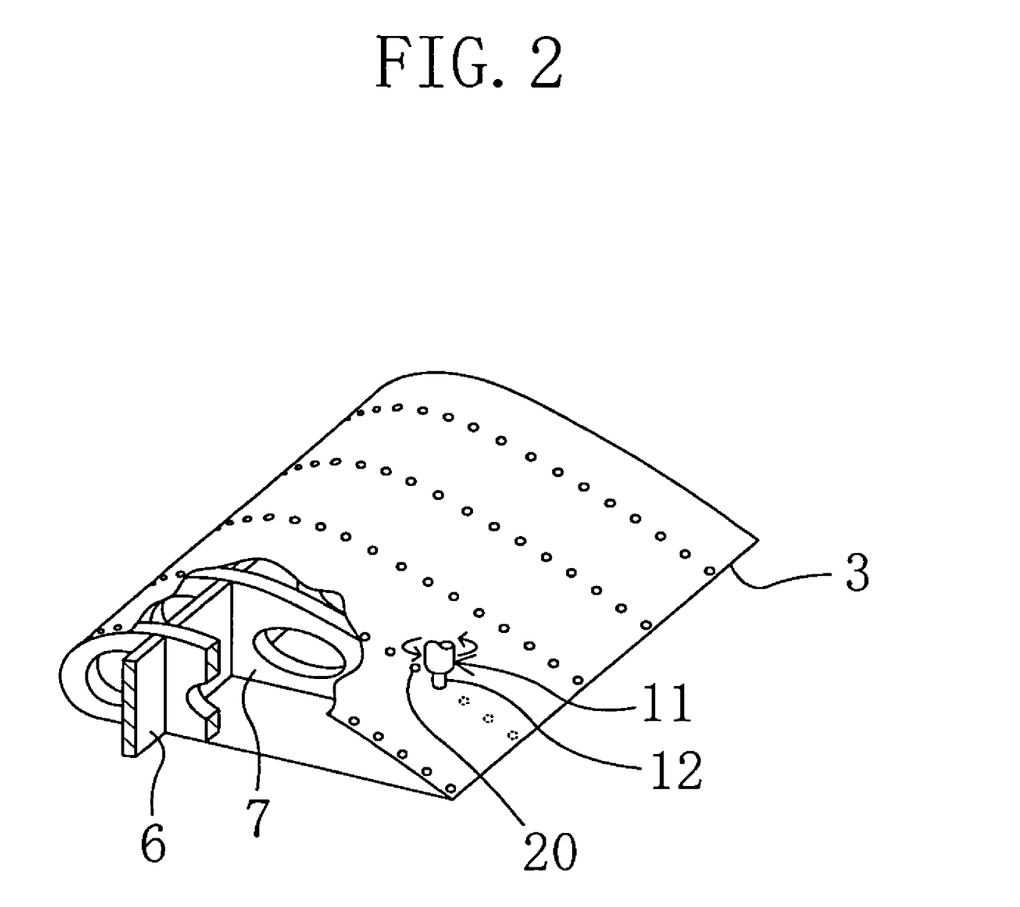
FIG. 2 is a perspective view of the movable trailing edge with a part partially broken away for explaining a movable trailing edge assembling method.

As shown in FIG. 2, the first outer plate 3 and the main body 2 are joined by friction stir welding in a dotted pattern. In detail, joint parts 20 in the first outer plate 3 are dotted along the upper face of the joint portion 10 and the side end faces of the ribs 7 of the main body 2.

A method for fabricating the movable trailing edge 1 will be described next.

First, the block member 4 is shaved by a mechanical process to form the main body 2 from the block member 4, the first outer plate 3 is formed so as to fit to the contour of the main body 2, and then, the first outer plate 3 is joined to the main body 2.

In the joining, the main body 2 is placed first on a workbench, a floor or the like and the first outer plate 3 is placed over the main body 2. In this time, the reverse face of the first outer plate 3 and the side end face of the structural frame member 9, that is, the side end face of the spar 6 or each rib 7 is in contact with each other and the reverse face of the first outer plate 3 and the upper face of the joint portion 10 of the main body 2 are in contact with each other. In this state, the first outer plate 3 and the main body 2 form a sealed structure having a hollow inside.

Figure 3:
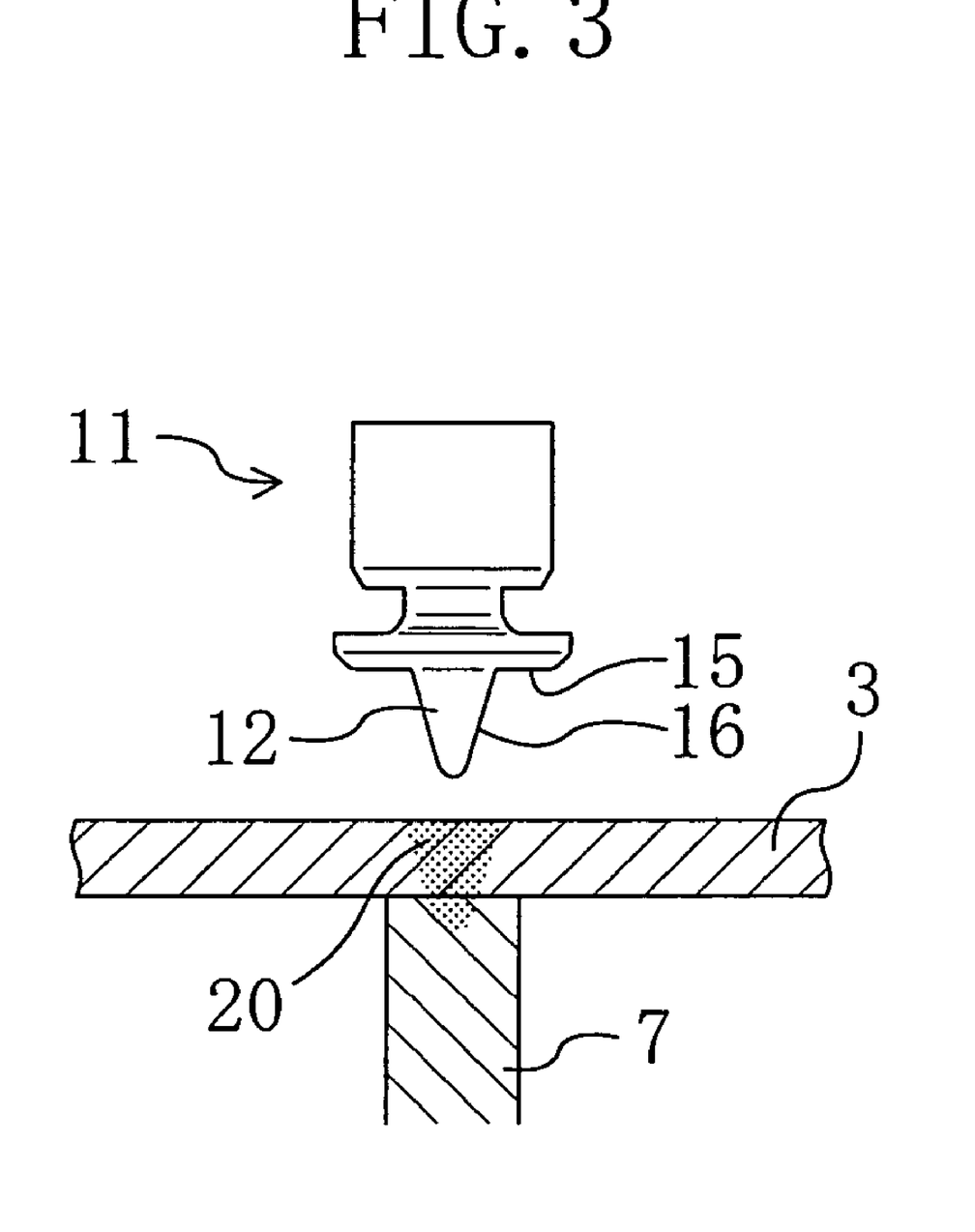
FIG. 3 is an enlarged section of a joint part of the movable trailing edge.

Next, a tool 11 for friction stir welding having a rotating probe 12 is pressed against the obverse face of the first outer plate 3. A length of a pin 16 protruding from a shoulder 15 of the rotating probe 12 is longer than the thickness of the first outer plate 3. The number of rotation of the tool 11 is set in the range between 750 rpm and 3000 rpm, both inclusive. By the rotation of the rotating probe 12, the pin 16 pierces the first outer plate 3 and enters into a part of the main body 2 (namely, the side end face of the spar 6 or each rib 7 or the upper face of the joint portion 10). At this time, the first outer plate 3 and the main body 2 are softened and stirred by frictional heat at a part where the pin 16 enters and at a part where the shoulder 15 is pressed, to cause plastic flow. Thereafter, the probe 12 is pulled up. In so doing, the joint part 20 where the plastic flow is caused looses the frictional heat, to be cooled and solidified. As a result, the first outer plate 3 and a part of the main body 2 are joined as shown in FIG. 3.

The sequential repetition of the above operation for joint points results in dispersed joints of the first outer plate 3 and parts of the main body 2.

The main body 2, including the structural frame member 9 composed of the spar 6 and the ribs 7 which intersect with one another, has comparatively high rigidity. For this reason, the spar 6 and the ribs 7 are not buckled even if large downward force is received. Also, when the probe 12 is pressed from above, the probe 12 receives the reaction force by the rigidity of the main body 2. Therefore, the probe 12 accurately enters into the first outer plate 3 and the main body 2 even unless external force is applied from the reverse side of the main body 2 with the use of an exclusive jig. Hence, the aforementioned joining operation necessitates no special jig.

According to the present embodiment, the main body 2 is provided with the structural frame member 9 having high rigidity, the side end face of the main body 2 (specifically, the side end faces of the spar 6 and the ribs 7 and the upper face of the joint portion 10) has width of some extent, and the friction stir welding is conducted from the obverse side of the first outer plate 3 in the state where the first outer plate 3 and the side end face of the main body 2 are overlaid with each other. Hence, the first outer plate 3 and the main body 2 are joined to each other by friction stir welding with no exclusive jig used. As a result, the workability is enhanced, and the fabrication cost is lowered because of no exclusive jig used.

Further, the joint parts 20 are arranged in a dotted pattern, resulting in speed joining of the first outer plate 3 and the main body 2 at low cost.

The main body 2 is formed integrally as the shaved member, resulting in further increase in rigidity of the main body 2 and increase in the reliability of the friction stir welding.

Figure 4:
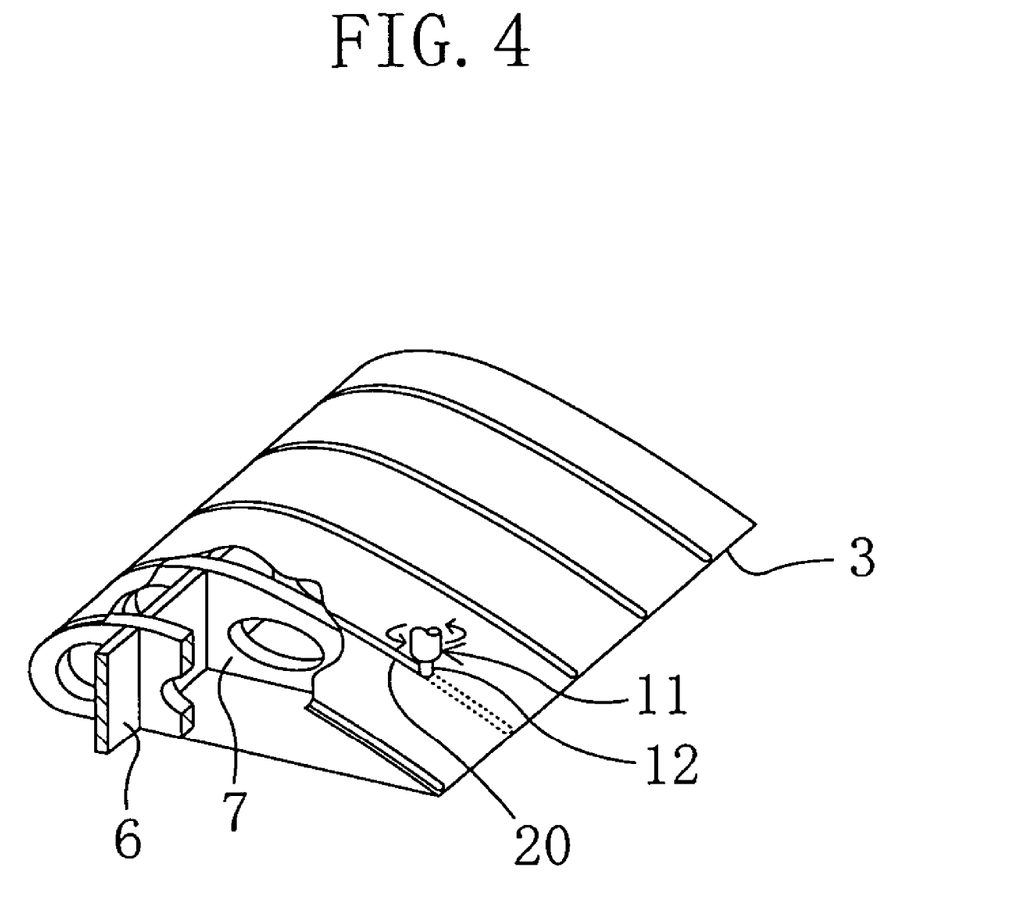
FIG. 4 is a perspective view of the movable trailing edge with a part partially broken away for explaining another movable trailing edge assembling method.

In the above embodiment, the joint parts 20 are arranged in a dotted pattern but may be arranged linearly for further increasing the joining strength. For example, as shown in FIG. 4, it is possible that the rotating probe 12 is moved linearly along the side end face of each rib 7 to join by continuous welding the first outer plate 3 and the main body 2 at a part along the side end face of each rib 7.

In the continuous joining, the pin 16 is pressed and enters to reach the side end face of the rib 7 from the obverse side of the first outer plate 3, while rotating the tool 11 at a given number of rotation in the range between 750 rpm and 3000 rpm, both inclusive, and the pin 16 is moved at a feed speed in the range between 300 mm/minute and 1000 mm/minute, both inclusive, while setting the angle of the tool 11 at a lead angle in the range between 0 degree and 5 degrees, both inclusive.

Further, the first outer plate 3 and the main body 2 are joined to each other by friction stir welding in the above embodiment, but it is possible to join the first outer plate 3 and the main body 2 to each other by friction pressure welding. An embodiment in which the first outer plate 3 and the main body 2 are joined to each other by friction pressure welding will be described next.

Figure 5:
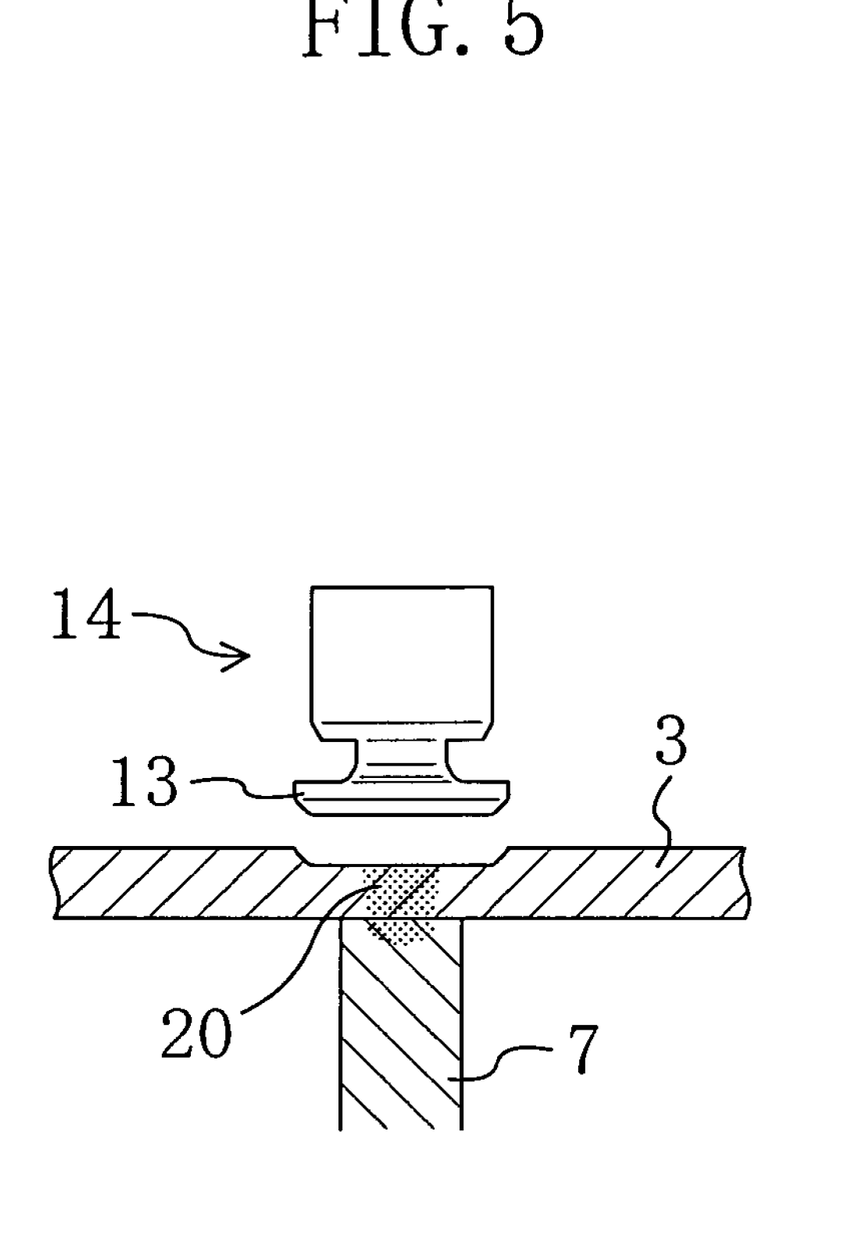
FIG. 5 is an enlarged section of a joint part of the movable trailing edge.

As shown in FIG. 5, a rotating probe 13 of which tip end is formed flat is used for the friction pressure welding. In this embodiment, after the first outer plate 3 is placed to cover the main body 2, a tool 14 for friction pressure welding is pressed against the first outer plate 3 from the obverse side. In so doing, frictional heat generated at the contact face between the rotating probe 13 and the first outer plate 3 is transferred to parts of the first outer plate 3 and the main body 2 where they are in contact with each other, to cause plastic flow in the contact part. Thereafter, when the probe 13 is pulled up, the parts where the plastic flow is caused loose the frictional heat to be cooled and solidified, thereby being joined.

It is noted that the joint parts 20 may be arranged in a dotted pattern, arranged in a straight line pattern, or arranged in a curved line pattern in the friction pressure welding, also.

In each embodiment, the first outer plate 3 and the main body 2 are made of aluminum. However, either or both thereof may be made of a metal other than aluminum and they may be made of the same material or different materials.

Though it is preferable that the main body 2 is made of a shaved member, the main body 2 may be an assembly of a plurality of members only if no deformation is caused and the main body 2 has strength that an appropriate degree of reaction force is generated when the probe is pressed thereagainst.

The present invention is not limited to the movable trailing edge 1 and is applicable to various kinds of wings and blades. The present invention is applicable to doors of aircrafts, blades of helicopters, vanes of windmills, marine screws, impellers of blowers, vanes of water turbines and the like. In addition, the present invention is applicable to assembly structures such as racks, metal furniture and the like.

In each embodiment, the spar 6 and the ribs 7 serve as the first plate and the second plates in the present invention, respectively, and the structural frame member 9 includes one first plate and the plural second plates. However, the structural frame member according to the present invention may have one or more first plates and one second plates or may have plural first plates and plural second plates.

The present application is based on Patent Application No. 2002-175822 filed in Japan on Jun. 17, 2002, the entire contents of which are hereby incorporated by reference.

What is claimed is:

1. A hollow assembly structure comprising:
    a structural frame member including at least one first plate and at least one second plate, the first plate and the second plate being arranged so that plate faces thereof intersect each other for keeping positions of the first plate and the second plate by each other;
    an outer plate that covers the structural frame member,
    wherein a side end face of the first plate or the second plate of the structural frame member is overlaid with the outer plate such that any abutting edges of said outer plate do not overlie said first and second plates; and
    at least one of a friction stir weld and friction pressure weld joining, without a stud, the outer plate to the first plate or the second plate, the weld comprising cooled and solidified material undergoing plastic flow extending from an obverse side of the outer plate to a part of the first plate or the second plate at an overlapped portion;
    wherein, the hollow assembly structure composes at least a part of a wing, and
    the first plate is a spar, the second plate is a rib, and the outer plate is a blade face, the structural frame member being formed by shaving out a block member, and the first plate and the second plate being formed integrally.

2. The hollow assembly structure of claim 1, wherein
    the outer plate is friction stir welded or friction pressure welded to the side end face of the first plate or the second plate so as to cover one side of the structural frame member,
    an additional outer plate is provided which covers another side of the structural frame member, and
    the structural frame member and the additional outer plate are formed by shaving out the block member so as to be integral.

3. The hollow assembly structure of claim 1, wherein
    joint parts of the structural frame member and the outer plate are arranged in the outer plate in a dotted pattern.

4. The hollow assembly structure of claim 2, wherein
    joint parts of the structural frame member and the outer plate are arranged in the outer plate linearly.

5. The hollow assembly structure of claim 1, wherein
    joint parts of the structural frame member and the outer plate are arranged in the outer plate in a dotted pattern.

6. The hollow assembly structure of claim 1, wherein
    joint parts of the structural frame member and the outer plate are arranged in the outer plate in a dotted pattern.

7. The hollow assembly structure of claim 1, wherein
    joint parts of the structural frame member and the outer plate are arranged in the outer plate linearly.

8. The hollow assembly structure of claim 1, wherein
    joint parts of the structural frame member and the outer plate are arranged in the outer plate linearly.

9. A movable trailing edge for an aircraft comprising:
    a main body of a box shape having an opening formed by shaving and of which an outer face serves as one of a blade face, a spar or a rib being integrally formed inside of the main body; and
    an outer plate which covers the opening of the main body of which an obverse face serves as another blade face,
    wherein a side end face of the spar or the rib of the main body is overlaid with the outer plate; and
    at least one of a friction stir weld and friction pressure weld joining, without a stud, the outer plate to the spar or the rib, the weld comprising cooled and solidified material undergoing plastic flow extending from an obverse side of the outer plate to a part of the spar or the rib at an overlapped portion.

\* \* \* \* \*